United States Patent [19]

Weiss

[11] Patent Number: 4,615,240
[45] Date of Patent: Oct. 7, 1986

[54] GEAR ARRANGEMENT FOR A MOTOR VEHICLE

[75] Inventor: Heinz Weiss, Bensheim, Fed. Rep. of Germany

[73] Assignee: Deere & Company, Moline, Ill.

[21] Appl. No.: 780,228

[22] Filed: Sep. 24, 1985

Related U.S. Application Data

[63] Continuation of Ser. No. 487,391, Apr. 21, 1983, abandoned.

[30] Foreign Application Priority Data

May 13, 1982 [DE] Fed. Rep. of Germany ....... 3217993

[51] Int. Cl.4 ...................... F16H 37/00; F16H 37/08; F16H 57/10; B60K 17/28
[52] U.S. Cl. ........................................ 74/740; 74/359; 74/700; 74/701; 74/695; 74/763; 74/767; 74/789; 74/DIG. 11; 74/720.5; 180/53.2
[58] Field of Search ................ 74/740, 762, 763, 758, 74/766, 767, 753, 754, 756, 700, 701, 694, 695, 674, DIG. 11, 720.5, 710.5, 359, 333, 745, 789; 180/53.2

[56] References Cited

U.S. PATENT DOCUMENTS

| 2,881,627 | 4/1959 | Hubert et al. | 180/53.2 |
| 3,282,131 | 11/1966 | Smith | 74/758 |
| 3,377,885 | 4/1968 | Tuck et al. | 74/705 X |
| 3,405,574 | 10/1968 | Livezey | 74/705 X |
| 3,799,003 | 3/1974 | Van Dest | 74/740 |
| 3,837,237 | 9/1974 | Rossler et al. | 74/740 |
| 3,906,817 | 9/1975 | Kreitzberg | 74/740 |
| 4,041,805 | 8/1977 | Jochmann | 74/740 |
| 4,074,592 | 2/1978 | Stevens et al. | 74/740 |
| 4,141,424 | 2/1979 | Murayama et al. | 180/53.2 |
| 4,200,006 | 4/1980 | Ehrlinger et al. | 74/740 X |
| 4,271,715 | 6/1981 | Arai | 74/359 X |
| 4,345,488 | 8/1982 | Reed | 74/710.5 X |
| 4,404,869 | 9/1983 | Numazawa et al. | 74/740 |
| 4,470,326 | 9/1984 | Schmidt | 74/701 X |

FOREIGN PATENT DOCUMENTS

| 24100 | 2/1981 | European Pat. Off. . |
| 0076591 | 4/1983 | European Pat. Off. . |
| 1285338 | 12/1968 | Fed. Rep. of Germany . |
| 2054363 | 5/1972 | Fed. Rep. of Germany . |
| 2220729 | 11/1973 | Fed. Rep. of Germany . |
| 2645957 | 4/1978 | Fed. Rep. of Germany . |

OTHER PUBLICATIONS

U.S. Case No. 8239, Ser. No. 419,091, Filed Sep. 16, 1982.
U.S. Case No. 8241, Ser. No. 419,092, Filed Sep. 16, 1982.

Primary Examiner—Kenneth J. Dorner
Assistant Examiner—Stephen B. Andrews

[57] ABSTRACT

An engine shaft drives oppositely rotating bevel gears which can be coupled to a hollow clutch shaft by forward and reverse clutches. The clutch shaft is coupled to the input shaft of a six-speed, change-speed gearbox through a two-stage epicyclic range gear with a direct drive clutch and brakes for engaging the overdrive and underdrive stages, respectively. An epicyclic creep gear can be selectively switched in upstream of the range gear. Thus, a coupling sleeve couples the clutch shaft either to the input of the range gear or to the input sun wheel of the creep gear. Since the creep gear reverses the sense of rotation, a changeover of control of the clutches is effected when the creep gear is engaged.

6 Claims, 3 Drawing Figures

| CHANGE-SPEED GEAR | | RANGE GEAR | | | | | |
|---|---|---|---|---|---|---|---|
| GEAR | RATIO | UD (KM/HR.) | RATIO | DD (KM/HR.) | RATIO | OD (KM/HR.) | |
| 1 | | 1.5 | | 1.95 -------> | | 2.54 | |
| | 2.1 | | 1.61 | | 1.61 | | |
| 2 | | 3.15 <------ 4.10 | | | | 5.33 | |
| | 1.57 | | 1.20 | | 1.20 | | |
| 3 | | 4.94 | | 6.43 | | 8.36 | |
| | 1.42 | | 1.09 | | 1.09 | | |
| 4 | | 7.02 | | 9.13 | | 11.87 | |
| | 1.59 | | 1.22 | | 1.22 | | |
| 5 | | 11.17 | | 14.52 | | 18.87 | |
| | 1.67 | | 1.28 | | 1.28 | | |
| 6 | | 18.65 | | 24.25 | | 31.50 | |

GEAR ARRANGEMENT FOR A MOTOR VEHICLE

This application is a continuation of application Ser. No. 487,391, filed Apr. 21, 1983, now abandoned.

BACKGROUND OF THE INVENTION

The present invention relates to a gear arrangement for a motor vehicle, especially a tractor or other agricultural or construction vehicle. The arrangement is of the type comprising a range gear in cascade with a creep gear, and means for selectively driving the range gear directly or through the creep gear.

Gearboxes are known from DE AS No. 1 285 338 and from EP No. 0 024 100 with driven bevel gears and forward and reverse clutches for coupling these gears to a clutch shaft. In these known gearboxes, the range gear is on the output shaft-line of the change-speed gear and no provision is made for a creep gear.

Since it is highly desirable to incorporate a creep gear in tractors in order to provide extremely low tractor speeds, such a gearbox of the aforementioned type has been proposed and is described in our European patent application EP No. 82 304 972 1. In this prior application, the clutch shaft is rotationally fixed to the input member of the range gear and the forward and reverse clutches couple two driven bevel gears, respectively, to the clutch shaft for normal forward and reverse drive. A third clutch is provided for coupling the reverse bevel gear to the creep gear. The reverse bevel gear is chosen because the creep gear affects a reversal of the sense of rotation of the changespeed gear input shaft relative to the clutch shaft.

SUMMARY OF THE INVENTION

An object of the present invention is to provide a further improved gear arrangement which can be incorporated in a transverse or a longitudinal gearbox and which allows a creep gear to be incorporated in a very simple way.

The present invention provides a gear arrangement for a motor vehicle comprising a driving shaft, a range gear in cascade with a creep gear, a shaft carrying the output from the range gear and received within the driving shaft, and means for selectively coupling the driving shaft to either of a range gear input member and a creep gear input member. The driving shaft may be the clutch shaft of the said prior European patent application but this clutch shaft is no longer rotationally fixed to the range gear input member but is coupled thereto for forward and reverse gears and is coupled to the creep gear for the creep gears which are available in both forward and reverse.

The use of standard components and modular design enables considerable savings in production costs for a range of gearboxes. It has been found that suitable gear ratios can be provided when the creep gear and two stages of the range gear are of the same construction, with their sun wheels of equal size and so on. This is particularly so if the change-speed gear is a six-speed gear and a specific example is given below showing a satisfactory spread of ratios for the 3×6=18 gears available in forward and reverse. Moreover, the gearbox casing is preferably provided with such an arrangement of partitions and cavities that various gearboxes can be assembled from the like components with inclusion or omission of special features (such as the creep gear), as desired.

DETAILED DESCRIPTION

Figure 1:
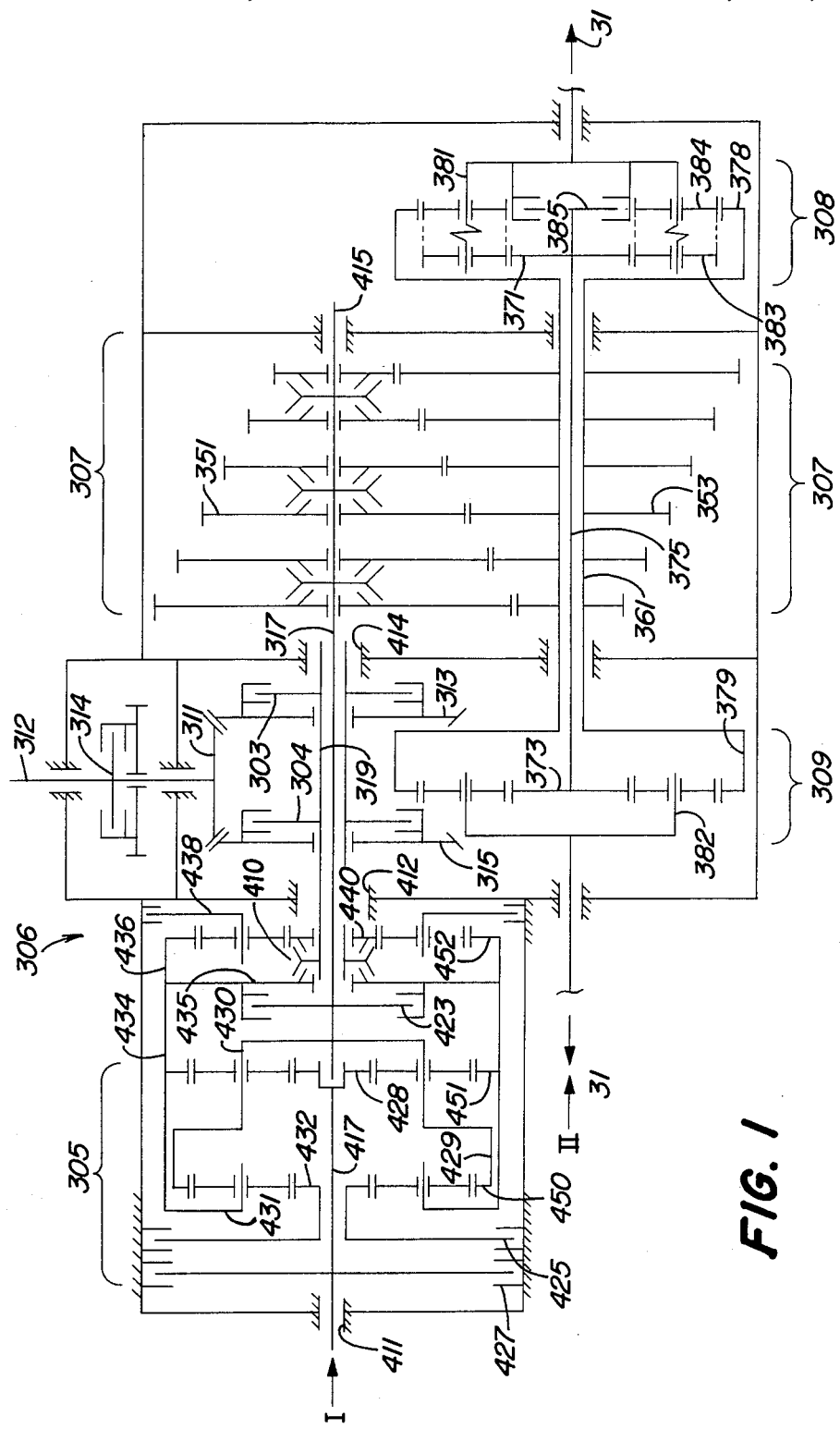
FIG. 1 is a schematic representation of a transverse gearbox, sectioned in the plane containing the centerlines of the main shafts.
Figures 2, 3:
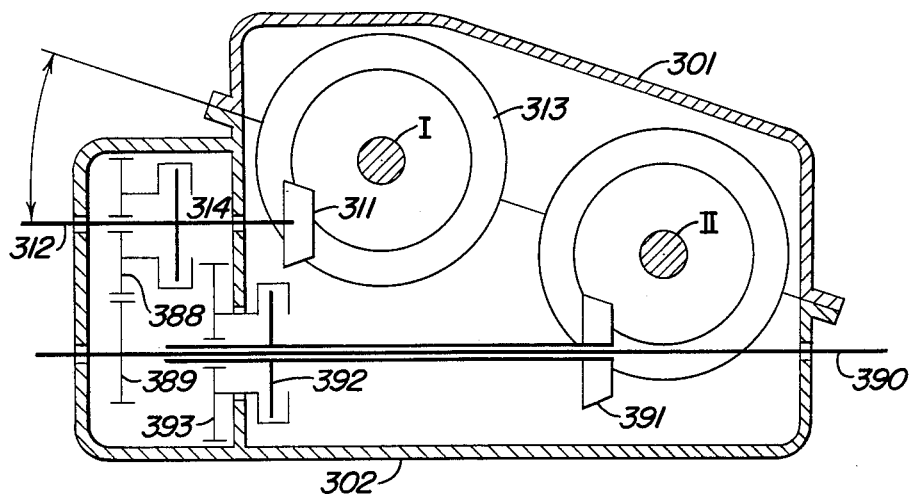
FIG. 2 is a vertical section at right angles through the gear box according to FIG. 1, including the gearbox housing in the longitudinal direction of the vehicle.
FIG. 3 is a table showing the behavior of the gearbox of the present invention.

FIG. 1 shows a very schematic section of the gearbox substantially on the parting plane of the housing which can be seen in FIG. 2, a plane which is inclined with respect to the engine shaft 312. The gearbox has its rotating parts arranged on only two shaft lines, I and II, which extend parallel to each other so as to achieve a small depth and longitudinal dimension (see FIG. 2). It would also be possible to arrange some of the components on a third shaft, but the space-saving arrangement on only two shaft lines is advantageous.

In the left part of FIG. 1, there can be seen a three-speed epicyclic range gear 305 which changes gear in response to alterations in load and on the right adjacent to it, a creep gear 306. In the middle part, the engine shaft 312 enters from above with a clutch 314 for coupling the engine to a PTO shaft 390 (FIG. 2) via spur gears 388 and 389.

The engine shaft 312 carries a driving bevel gear 311 which is keyed on the shaft and meshes with a driven bevel gear 313 and an oppositely rotating driven bevel gear 315. The driven bevel gears 313 and 315 are journalled on a hollow clutch shaft 319 and may be selectively clutched thereto by a forward clutch 303 or a reverse clutch 304, respectively. The range gear 305, creep gear 306, clutch shaft 319 and driven bevel gears are all on the first shaft line I, as is an input shaft 317. Shaft 317 extends from the range gear 305, through the hollow clutch shaft to a six-speed synchromesh, constant mesh change-speed gear 307 coupling the input shaft 317 to a hollow output shaft 361 on the second shaft line II. The gear 307 comprises loose input gears 351 on the input shaft 317, synchromesh dogs for clutching these gears to the input shaft, and output gears 353, all fixed to the output shaft 361.

The output gears 353 are flanked on the left and right by respective halves of a spur gear epicyclic differential constructed in two parts 308, 309. The half shafts 31, which are disposed in axial alignment with the main line of shafts II, extend outwardly from the left and right halves of the spur gear differential to wheel axle drives which are not shown here.

The gears 305 and 307 make possible 3×6=18 forward speeds and the same number of reverse speeds. Moreover, the creep gear 306 can be selectively engaged and, with a step-down ratio of 1:3.3, makes available additionally a further range of theoretically 18 very low speeds.

The bevel gears 311, 313 and 315 preferably have helical teeth and the clutches 303 and 304 are preferably plate or multiplate clutches which can be engaged and disengaged on the go. They are the main clutches and no separate clutch is needed in the engine shaft 312.

The hollow clutch shaft 319 extends through bearings 412 and 414 in partition walls of the gearbox and on its left-hand end are journalled the creep gear sun-wheel 440 and a cylindrical casing 434 which unites the annulus 452 of the creep gear, the annulus 451 of an underdrive stage of the range gear and the planet carrier 431 of an overdrive stage of the range gear 305. Moreover, the casing 434 can be clutched directly to the input shaft 317 for direct drive by a clutch 423.

A dog clutch sleeve 410, preferably with synchronizer rings, enables either the creep gear sun-wheel 440 or the casing 434 to be driven by the hollow clutch shaft 319. The carrier 438 of the creep gear planet wheels is either permanently fixed, or at least fixed by a brake 434, when the creep gear is selected. The annulus 450 of the overdrive stage of the epicyclic gear 305 is connected via an intermediate housing part 429 with the planet wheel carrier 430 of the underdrive stage which is laterally inside the overdrive stage. The planet wheel carrier 430 is also connected with the input shaft 317 so as to be fixed for rotation therewith.

The shaft 417 of the planetary gear unit 305 adjoins the outer end of the driving shaft 317 without being fixed for rotation therewith. The sun-wheel 428 of the underdrive stage is rigidly connected to the shaft 417 while the sun-wheel 432 of the overdrive stage is mounted so as to be loosely rotatable on the shaft 417. The sun-wheel 432 can be locked by means of a brake 425 and the sun-wheel 428 by means of a brake 427.

In the following, the power flow path, according to the left part of the drawing, will be further explained.

The creep gear 306 is rendered operative by engaging the dog clutch coupling 410 to the creep gear sun-wheel 440. The hollow shaft 319 is driven by one of the two bevel gears 313, 315 and drives the sun wheel 440 which is now fixed on it, after operation of the clutch 303 or 304. Since the creep gear effects reversal of rotation, it is necessary to engage the reverse clutch 304 for forward creep gears and to engage the forward clutch 303 for reverse creep gears. This is preferably achieved by automatic changeover of hydraulic control lines to the clutches or of electrical control when the creep gear is selected so that the operator controls (normally pedals) always have the same associations of forward and reverse.

The creep gear sun wheel 440 is in mesh with the planet wheels of the fixed planet wheel carrier 438 and the planetary housing 434 is driven with a very considerably reduced gear ratio, e.g. at a speed of rotation which is reduced by a factor of about 3.

The range gear 305, which is constructed of the two epicyclic stages and the direct drive clutch 423, changes gear in response to variations in load. Depending upon which of the brakes 425, 427 is operated, it is possible to step up or step down the gear ratio in the sense of an increase or reduction in the rotational speed of the driving shaft 317. When the brake 427 is engaged, the sun wheel 428 of the inwardly located epicyclic stage is stationary. The power flows from the casing 434 (which is driven directly from the hollow shaft 319 or via the creep gear 306) through the planet wheel carrier 430 to the shaft 317 (underdrive). When the brake 425 is engaged, the sun wheel 432 is stationary and the power flows from the casing 434 via the planet carrier 431 to the annulus 450 so that the driven shaft 317 rotates at an increased rotational speed (overdrive or third speed range).

The direct (second) speed range is obtained via the clutch 423 with both brakes 425 and 427 disengaged. It is preferable to provide the brake 438 for the planet wheel carrier of the creep gear 306. It must be engaged when the creep gear is engaged, but should be disengaged to avoid an unnecessarily high and hence wear-producing simultaneous running speed of the planet wheels and of the sun wheel 440. Depending on the operation of the gear change possibilities referred to above, including the clutches or brakes 303, 304, 423, 425 and 427, and the dog clutch coupling 410 (of which 303, 304, 423 and 427 are operable under load), the change-speed gear input shaft 317 is driven at various different ratios and directions of rotation by the two gear units 305 and 306 which are connected in tandem with the change speed gear 307. In fact, there are available, at this input shaft 317, 3×2 forward ranges and 3×2 reverse ranges which can then be further modified and multiplied in the multi-stage (here, for example, six stage) change-speed gear 307.

The driving shaft 317, which extends through the hollow clutch shaft 319, is mounted in a bearing 415 in the outer casing wall and indirectly via the hollow shaft 319 in the bearings 412 and 414. The shaft 417 is mounted in a bearing 411 in an outer wall and is journalled additionally on the end of the shaft 317.

The input shaft 317 extends in the right-hand half of FIG. 1 through the change-speed gear 307 with six gears 351 on the input side freely rotatable on the shaft 317.

Synchromesh sleeves enable any one of these input gears to be engaged with the input shaft 317. The input gears 351 are in constant mesh with six corresponding output gears 353 all integral with the hollow output shaft 361. The graduation of the gear ratios in the change speed gear 307 may be so selected in relation to the ratio of the epicyclic gear 305 that there is an uninterrupted speed graduation with a ratio from gear to gear of preferably about 1:1.2. In the case of agricultural tractors, the ratios of other components are so harmonized with the change speed gear that a concentration of the intervals in the main working range of between 5 and 12 km/hr is obtained.

The differential may be a conventional bevel gear differential or a two-part epicyclic differential, the two halves 308, 309 of which are rigidly interconnected by their sun wheels 371, 373 via a differential shaft 375 passing through the hollow output shaft 361. The shafts 361 and 375, which are located one within the other, form the output side line of shafts II which advantageously project in axial alignment outside the gearbox housing into the left and right half shafts 31 which are driven by the differential halves 308 and 309. The drive of the differential gears 308, 309 takes place via the hollow shaft 361 which is connected with the corresponding annuli 378, 379. The drive is transmitted to the two half-shafts 31 via the left and right planet wheel carriers 381, 382. The differential action is obtained by the two sun wheels 371, 373 which are rigidly interconnected. This is described in detail in our European patent application EP No. 82 304 972 1.

FIG. 2 shows the transversely disposed main gear box unit according to FIG. 1 which is, in this case, sectioned in the longitudinal direction of the vehicle, approximately in the plane of the input shaft 312.

The housing 301, 302 of the main gearbox may be made of light-weight construction. The housing is formed of two shells. The upper shell 301 of the housing and the larger lower shell 302 of the housing abut against each other at a parting plane of division which contains the center lines of the lines of shafts I and II. The halves of the housing may be made of cast iron.

In the left part of FIG. 1 can be seen a bulge of the lower housing part which advantageously extends only to the region of the input shaft 312 and contains, for example, the clutch 314 for the PTO shaft 390.

A hollow shaft on the PTO shaft provides for front wheel drive via a clutch 392 and a spur gear 393 and is driven by a bevel gear 391 meshing with a gear on the shaft line II, say on the annulus 379.

In order to cover a speed range from 1.5 km/hr to 30 km/hr, at least 18 gear ratios are usually necessary for an agricultural vehicle. This is because of the ratio increment of the synchronized change-speed gear, the increase in torque and the flexibility of the rotational speed of the engine under load and the need for a fine gear ratio increment in the main working range of the agricultural tractor, of 5 to 12 km/hr, in order to be able to set the vehicle at the optimum operating point at any given time.

Unlike road vehicles, agricultural tractors and constructional (earth-moving) machines require that in the main working range, making use of the flexibility of the engine speed and the load change-speed intervals, the speed range will be adjusted without interrupting the torque. Since the vehicle behaves like a road vehicle in the upper range of speeds on the road, a synchronized gear change with interruption of torque is sufficient in this case. The combination of these requirements leads in the case of the embodiment shown to a 3×6 partly load-responsive, change-speed gearbox unit with a 3-stage load-responsive, change-speed planetary gear 305 and a synchronized 6-stage, change-speed gear 307.

So far as the technicalities of gear changing are concerned, this gearbox has the following characteristics: for operating the gearbox, only one gear lever is provided by means of which the six speeds of the change-speed gear unit 307 are changed in a double H gate in which a tumbler switch is embodied for the remote controlled operation of the underdrive, direct drive and overdrive gears of the load-responsive range gear 307.

The behavior of an epicyclic gear is described by the equation:

$$n_A = n_C(g+1) - n_S g$$

wherein $n_A$ = speed of rotation of annulus
$n_C$ = speed of rotation of carrier
$n_S$ = speed of rotation of sun wheel
$g$ = step-down ratio from the annulus to the sun wheel when the planet carrier is fixed.

It is possible, as will appear below, to obtain appropriate ratios with a value of "g" which is the same for both the overdrive and underdrive stages of the range gear 305, and also for the creep gear. This means considerable savings in construction costs, as all three epicyclic stages can employ indentical components. This concept can be extended to the differential epicyclic stages.

A suitable value for "g" is 1/3.3 which gives g+1=1.3 and following ratios:

| Underdrive | $n_S$ (428) = 0 |
|---|---|
| | $n_A = 1.3 \, n_C$ |
| Step down ratio 1/1.3 (from annulus to carrier) | |
| Direct drive | Unity ratio |
| Overdrive | $n_S$ (432) = 0 |
| | $n_A = 1.3 \, n_C$ |
| Step up ratio = 1.3 (from carrier to annulus) | |

| -continued | |
|---|---|
| Creep Gear | $n_C = 0$ |
| | $n_A = -n_S 3.3$ |
| Step down ratio = 1/3.3 (with reversal of direction as discussed above, from sun to annulus). | |

As shown in the table of FIG. 3, the gearbox behaves in direct drive like a six-speed gearbox, but also has the possibility of underdrive and overdrive. During synchronized changing up or changing down, the gearbox automatically engages the direct drive of the higher or lower stage (as indicated by the diagonal arrows), so as to keep the interval between gear ratios as small as possible and to give the driver in the new position at any given time the possibility of overdrive and underdrive under load. This gear changing operation may be electrically monitored and controlled. The dashed horizontal arrows illustrate load-responsive gear changes.

The left-hand column of the table gives the change-speed gears (gear 307) and the second column shows the corresponding gear-to-gear ratios, e.g. the speed of the output shaft 361 relative to the input shaft 317, increased by a factor of 2.1 when changing up from first gear to second gear, and so on. The vehicle speeds are then tabulated in km/hr for the underdrive, direct drive and overdrive conditions UD, DD and OD, respectively, of the range gear 305. Finally, the gear-to-gear ratios (shaft 319 to shaft 361) are indicated by the numbers in the diagonal arrows. For example, changing from underdrive in second gear to direct drive in first gear reduces the speed of the output shaft 361 relative to the shaft 319 by a factor of 1.61.

The speeds given in the table ranging between 1.5 and 31.50 km/hr correspond to a nominal working engine speed. Naturally, the speeds are reduced under load. For example, a load torque increase by a factor of 1.3 may pull down the engine speed by a factor of 1.43. All speeds in the table are then to be divided by 1.43.

Furthermore, the table does not take into account the creep gear which, when engaged, causes all speeds to be reduced by a factor of 3.3. Because of the overlap of ranges, the creep gear is only useful in first and second gears in which it will provide speeds under nominal engine speeds of 0.45, 0.59, 0.77, 0.95, 1.24 and 1.62 km/hr. The direct drive clutch is preferably spring-loaded into engagement and is released by application of hydraulic pressure. On the other hand, the brakes 425 and 427 are applied by application of hydraulic pressure. In the event of loss of hydraulic pressure, direct drive remains available.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A gear arrangement for a motor vehicle, comprising a driving shaft, a multiple gear ratio range gear in cascade with a creep gear, the creep gear being in cascade with a change speed gear, a range gear output shaft received within the driving shaft, and means for selectively coupling the driving shaft to either of a range gear input member and a creep gear input member, the creep gear being bypassed when the driving shaft is coupled to the range gear, the range gear being a two-stage epicyclic gear with a direct drive clutch for engaging an overdrive stage and with brakes for engaging an underdrive stage.

2. The gear arrangement, according to claim 1, wherein the selective coupling means is a coupling sleeve slidable on the driving shaft between the range gear input member and the creep gear input member.

3. The gear arrangement, according to claim 1, wherein the driving shaft is a clutch shaft which is driven from an engine shaft via input gears and forward and reverse clutches.

4. A gear arrangement for a motor vehicle, comprising a driving shaft, a range gear in cascade with a creep gear, a range gear output shaft received within the driving shaft, and means for selectively coupling the driving shaft to either of a range gear input member and a creep gear input member, the creep gear having an input sun wheel, an output annulus fixed for rotation with the range gear input member, a planet carrier and a brake for fixing the planet carrier only when the driving shaft is coupled to the sun wheel.

5. A gear arrangement for a motor vehicle, comprising a driving shaft, a range gear in cascade with a creep gear, a range gear output shaft received within the driving shaft, and means for selectively coupling the driving shaft to either of a range gear input member and a creep gear input member, the range gear input member being fixed for rotation with input elements of two range gear epicyclic stages, the two range gear epicyclic stages having output elements connected to a range gear output shaft, a further element connected to respective brakes and a direct drive clutch between the range gear input member and the range gear output shaft.

6. A gear arrangement for a motor vehicle, comprising a driving shaft, a multiple gear ratio range gear in cascade with a creep gear, a range gear output shaft received within the driving shaft, the range gear input member being fixed for rotation with input elements of two range gear epicyclic stages, the two range gear epicyclic stages having output elements connected to a range gear output shaft, a further element connected to respective brakes and a direct drive clutch between the range gear input member and the range gear output shaft, the two epicyclic stages of the range gear and the creep gear having sun gears of equal size, annuli of equal size, and planet wheels of equal size and means for selectively coupling the driving shaft to either of a range gear input member and a creep gear input member.

* * * * *